(12) United States Patent
Hiraguchi

(10) Patent No.: US 8,910,893 B2
(45) Date of Patent: Dec. 16, 2014

(54) DRIVE DEVICE

(71) Applicant: FUJIFILM Corporation, Tokyo (JP)

(72) Inventor: Kazuo Hiraguchi, Odawara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/851,102

(22) Filed: Mar. 27, 2013

(65) Prior Publication Data

US 2013/0214084 A1    Aug. 22, 2013

Related U.S. Application Data

(63) Continuation of application No. PCT/JP2011/062718, filed on Jun. 2, 2011.

(30) Foreign Application Priority Data

Sep. 29, 2010   (JP) .................. 2010-219420

(51) Int. Cl.
  *G11B 15/32*   (2006.01)
  *G11B 23/04*   (2006.01)
(52) U.S. Cl.
  CPC ............ *G11B 23/044* (2013.01); *G11B 23/047* (2013.01)
  USPC ...................................... 242/352
(58) Field of Classification Search
  CPC ....................................................... G03B 21/32
  USPC ............ 242/348, 348.2, 347, 347.2, 349, 352
  See application file for complete search history.

(56) References Cited

U.S. PATENT DOCUMENTS

| | | | | |
|---|---|---|---|---|
| 1,804,332 | A | * | 5/1931 | Gentiluomo ................... 242/348 |
| 3,111,281 | A | * | 11/1963 | Sinkewitsch ............... 242/334.5 |
| 3,601,336 | A | * | 8/1971 | Preston ...................... 242/608.1 |
| 3,603,528 | A | * | 9/1971 | Kingsley et al. ........... 242/348.4 |
| 3,993,260 | A | * | 11/1976 | Bauer, Sr. ...................... 242/601 |
| 4,754,878 | A | * | 7/1988 | Bose .............................. 206/398 |
| 4,949,912 | A | * | 8/1990 | Bose et al. .................... 242/349 |

FOREIGN PATENT DOCUMENTS

| | | |
|---|---|---|
| JP | H05-67972 | 9/1993 |
| JP | 2004-67285 A | 3/2004 |

OTHER PUBLICATIONS

Written Opinion of the ISA issued in International Application No. PCT/JP2011/062718 on Jun. 2, 2011.
International Search Report issued in International Application No. PCT/JP2011/062718 on Jun. 2, 2011.

* cited by examiner

*Primary Examiner* — William A Rivera
(74) *Attorney, Agent, or Firm* — SOLARIS Intellectual Property Group, PLLC

(57) ABSTRACT

There is provided a drive device including: a hub around which a recording tape is wound; a pair of flanges that are provided at both axial direction sides of the hub so as to be able to rotate relative to the hub, and that restrict a position, in a transverse direction, of the recording tape; a connecting member that connects outer peripheral portions of the pair of flanges together at least at a portion other than a traveling path of the recording tape; and a casing having, at an interior, a space in which the hub and the pair of flanges are accommodated and in which the recording tape travels, a fixing portion, that is provided at at least one of the pair of flanges or at the connecting member, being fixed to the casing.

20 Claims, 7 Drawing Sheets

DRIVE DEVICE

CROSS-REFERENCE TO RELATED APPLICATIONS

This application is a continuation application of International Application No. PCT/JP/2011/062718, filed Jun. 2, 2011, which is incorporated herein by reference, in its entirety. Further, this application claims priority from Japanese Patent Application No. 2010-219420, filed Sep. 29, 2010, which is incorporated herein by reference, in its entirety.

BACKGROUND

1. Technical Field

The present invention relates to a drive device having flanges that restrict the position, in the transverse direction, of a recording tape that is wound around a hub.

2. Related Art

There is known a structure that prevents widening of the interval between a pair of flanges at a reel for a tab tape at which a tab tape, in which an electronic part is installed, is wound on a core that is provided between the pair of flanges that oppose one another in an axial direction. In this structure, due to the core being supported rotatably with respect to the pair of flanges and outer peripheries of the pair of flanges being spanned by a bridge portion, the interval between the pair of flanges is prevented from widening (see, for example, Japanese Patent Application Laid-Open No. 2004-67285).

By the way, the accuracy of restricting the position in the tape transverse direction that is required of the flanges is completely different for a tab tape and a magnetic tape. Tapes made of paper, deposited films formed by a thin film of an inorganic compound being deposited on a plastic film, composite sheets in which plural resin layers are successively layered, and the like are known as tab tapes. In addition, tapes that are structured by forming a wiring pattern on a base film that is a polyimide film or the like and providing an insulating protective film, or the like, and that are utilized in applications such as, for example, liquid crystal display panels or highly-integrated logic LSIs or the like, are known as tab tapes. On the other hand, a magnetic tape has a thickness of a slight several microns (5μ to 10 μm), and the base film is formed of PET, PEN, PA or the like. The rigidity of the base of the magnetic tape is markedly different from that of the tab tape, in view of causing the magnetic tape to slide along a magnetic head and reading magnetic data. Further, as compared with a tab tape, a magnetic recording tape is markedly weak with respect to effects due to external force that, in particular, the edges thereof receive from the flanges.

Moreover, although the tab tape is guided by the flanges at the time of take-up, the position of the tab tape is physically restricted in the transverse direction and longitudinal direction by another positioning means at the time of usage. On the other hand, for magnetic tapes, as a countermeasure to edge damage being caused due to the position in the transverse direction being restricted by tape guides at the time of use within a drive, there are also known drives that do not have positional restriction in the transverse direction of tape guides. Due thereto, markedly higher accuracy than that for tab tapes has been demanded in recent years for the accuracy of positional restriction in the transverse direction of flanges with respect to a magnetic tape. Moreover, from the standpoint of the aforementioned effects with respect to external force that the tape edges receive from the flanges, a level that is completely different than that for tab tapes is demanded also of the accuracy with respect to the deformation of flanges for a magnetic tape.

SUMMARY

An object of the present invention is to provide a drive device that can improve the accuracy of restricting the transverse direction position of a recording tape that is traveling.

A drive device relating to a first aspect of the present invention includes: a hub around which a recording tape is wound; a pair of flanges that are provided at both axial direction sides of the hub so as to be able to rotate relative to the hub, and that restrict a position, in a transverse direction, of the recording tape; a connecting member that connects outer peripheral portions of the pair of flanges together at least at a portion other than a traveling path of the recording tape; and a casing having, at an interior, a space in which the hub and the pair of flanges are accommodated and in which the recording tape travels, a fixing portion, that is provided at at least one of the pair of flanges or at the connecting member, being fixed to the casing.

In accordance with this aspect, the position, in the transverse direction, of the recording tape that is wound around the hub is restricted by the flanges (the recording tape is guided at the desired traveling path). Here, in the present drive device, because the outer peripheral portions of the pair of flanges are connected together by the connecting member, deformation of the pair of flanges is suppressed. Namely, the recording tape is wound around the hub so as to be offset toward one flange side due to the curving (curvature) of the recording tape. When the flange deforms (warps) due to the pushing force from this recording tape, the accuracy of restricting the position in the transverse direction of the recording tape deteriorates. However, in the present drive device, because the outer peripheral portions of the pair of flanges are connected together by the connecting member, deformation of the pair of flanges is suppressed.

In particular, in the present drive device, the pair of flanges are fixed by the fixing portion to the casing. Therefore, the accuracy of restricting the position in the transverse direction of the recording tape with respect to the casing, i.e., the traveling path, by the pair of flanges is improved. Moreover, the pair of flanges are not rotated together with the hub accompanying the contact with the recording tape that travels, and interference between the recording tape and the connecting member, that accompanies the pair of flanges rotating with respect to the casing, is relatively prevented.

In this way, in the drive device of the above-described aspect, the accuracy of restricting the transverse direction position of the recording tape that travels can be improved.

The drive device of the above-described aspect may be structured so as to further include a rotating member to which the hub is fixed such that the hub rotates coaxially and integrally therewith, and that transmits rotational force to the hub.

In accordance with this aspect, because the rotating member is fixed to the hub, the hub and the rotating member rotate coaxially and integrally without offset between the centers thereof. Due thereto, interference between the hub and the pair of flanges is prevented or effectively suppressed, and the accuracy of restricting the transverse direction position of the recording tape that travels, by this pair of flanges, can be improved more.

In the drive device of the above-described aspect, there may be a structure in which a reference surface, that abuts an end surface in a rotational axial direction of the rotating member and is a positional reference in the rotational axial direction, is provided at the hub.

In accordance with this aspect, due to the reference surface of the hub contacting the rotating member, the position in the axial direction of the hub is determined accurately with respect to the rotating member, i.e., the casing that defines the traveling space of the recording tape. Therefore, the accuracy of restricting the transverse direction position, with respect to the casing, of the recording tape that travels can be improved more.

In the drive device of the above-described aspect, there may be a structure in which the casing is set such that a rotational axial direction of the rotating member coincides with a direction of gravitational force, and the flange, that is positioned at a lower side in the direction of gravitational force among the pair of flanges, is fixed at an outer peripheral side to a bottom plate of the casing via the fixing portion, and has, at the inner peripheral side, a supported portion that contacts and is supported by the bottom plate.

In accordance with this aspect, at the flange at the lower side in the direction of gravitational force, the outer peripheral side thereof is fixed to the bottom plate of the casing via the fixing portion, and the inner peripheral side is supported at the bottom plate by the supported portion. Due thereto, the flange at the lower side is not in a state of being supported in a cantilevered manner, and therefore, the flange at the lower side can well support the load, that is based on the mass of the recording tape, in a state in which bending is suppressed. Therefore, the accuracy of positioning, with respect to the casing, the transverse direction position of the recording tape that travels can be improved more.

In the drive device of the above-described aspect, there may be a structure in which the hub and the pair of flanges are connected so as to be able to rotate relatively, by bearing members that are interposed between the hub and the pair of flanges.

In accordance with this aspect, the hub is connected via the bearing members so as to be able to rotate relative to the pair of flanges. Therefore, the part (the reel) at which the hub and the pair of flanges are connected can be handled integrally before assembly to the casing. Further, it is easy to ensure the relative positional accuracy between the hub and the pair of flanges.

In the drive device of the above-described aspect, there may be a structure in which the bearing members are provided at an inner side of the hub.

In accordance with this aspect, the bearing members are provided at the inner side of the hub. For example, in a structure in which bearing structures are provided at the axial direction outer sides of the hub (the portion around which the recording tape is wound), either the axial direction dimension of the hub becomes large, or the dimension, in the hub axial direction, of the bearing portions is limited. In contrast, because the bearing members of the present drive device are provided at the inner side of the hub, the dimension, in the hub axial direction, of the bearing structures can be ensured within the range of the dimension in the hub axial direction that is limited within the casing. Due thereto, offset of the axes of the hub and the pair of flanges (tilting of the flanges with respect to the hub) is effectively suppressed. Namely, in the present drive device, not only deformation of the flanges themselves, but also relative displacement between the pair of flanges and the hub that is a separate body are effectively suppressed.

In the drive device of the above-described aspect, there may be a structure in which the hub and the pair of flanges are made able to rotate relatively by not being connected.

In accordance with this aspect, due to the hub and the pair of flanges being fixed independently to the casing and the rotating member, relative rotation is possible at the desired relative positions. Therefore, the pair of flanges and the hub are fixed to the casing without being affected by (the accumulation of) the manufacturing errors thereof, or the like, and are positioned highly accurately with respect to the traveling path within this casing.

In the drive device of the above-described aspect, there may be a structure in which the fixing portion is provided at the connecting member.

In accordance with this aspect, because the fixing portion is provided at the connecting member, the fixing portion can be provided without affecting the surface accuracy of the pair of flanges.

In the drive device of the above-described aspect, there may be a structure in which the flange, that is positioned at the lower side in the direction of gravitational force among the pair of flanges, has a portion that is positioned further toward a radial direction inner side than an outer peripheral surface of the hub, and the supported portion is provided at the portion.

In accordance with this aspect, the supported portion is provided at the portion, at the flange at the lower side, which portion is positioned further toward the radial direction inner side than the outer peripheral surface of the hub. Therefore, the supported portion can be provided without affecting the surface accuracy of the portion, at the flange at the lower side, which portion restricts the position of the recording tape.

In the drive device of the above-described aspect, there may be a structure in which the connecting member is structured as a body separate from the pair of flanges, and is fixed to outer peripheral portions of the pair of flanges respectively in a state of being nipped between opposing surfaces of the pair of flanges while contacting the opposing surfaces respectively.

In accordance with this aspect, the connecting member is fixed to the respective flanges in a state of directly contacting the surfaces thereof that face the other of the pair of flanges. Therefore, narrowing of the space between the opposing surfaces of the flanges is effectively suppressed as compared with, for example, a structure in which a connecting member is fixed to the flanges via adhesive layers, or a structure in which the connecting member is fit into the flanges with play.

As described above, the drive device relating to the present invention has the excellent effect of being able to improve the accuracy of restricting the transverse direction position of a recording tape that travels.

BRIEF DESCRIPTION OF THE DRAWINGS

An exemplary embodiment of the present invention will be described in detail based on the following figures, wherein.

Additionally.

DETAILED DESCRIPTION

Figure 1:
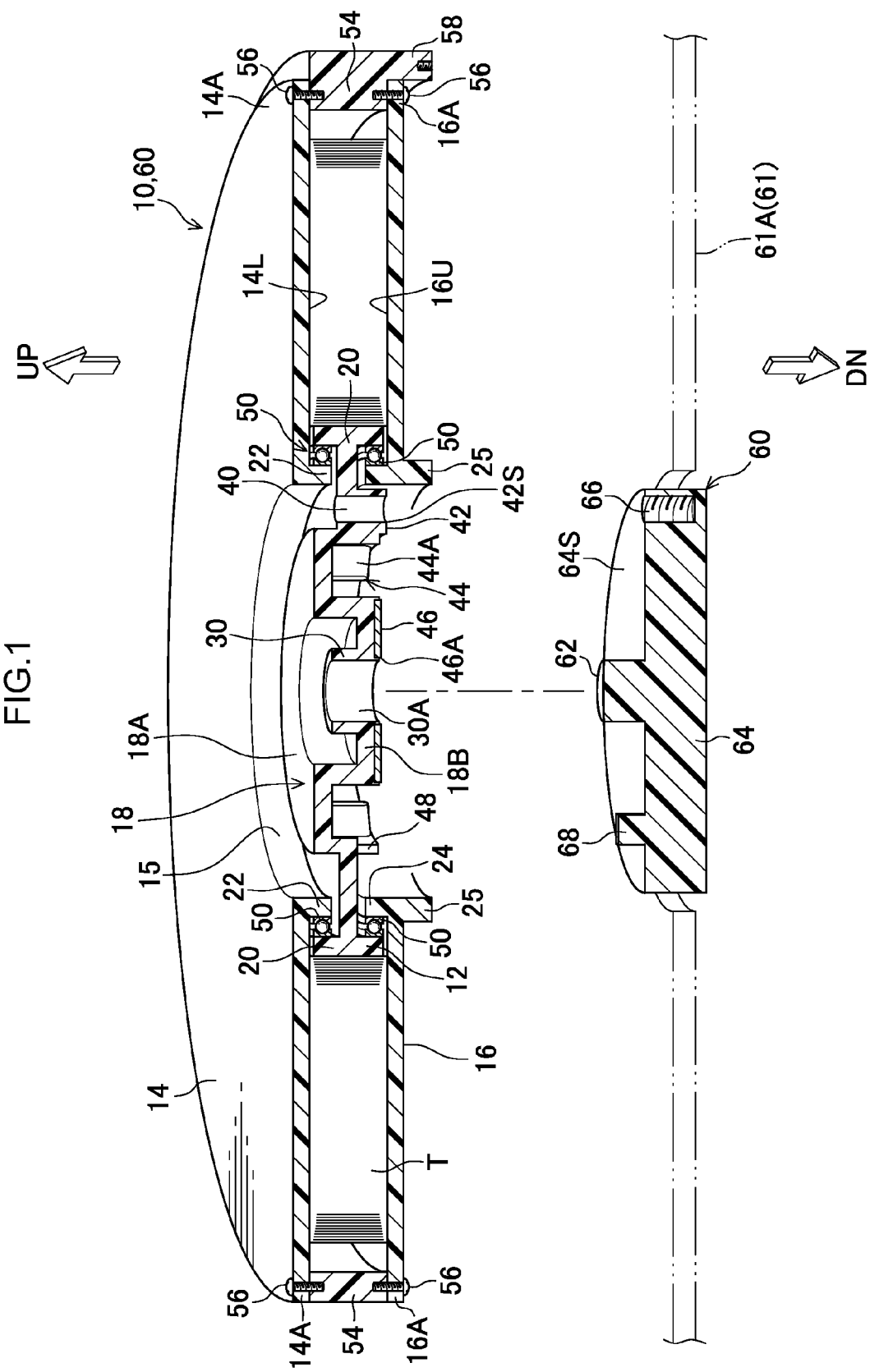
FIG. 1 is a cut view showing a state before joining of a reel and a rotating member of a drive device, in a drive device relating to an embodiment of the present invention.
Figure 2:
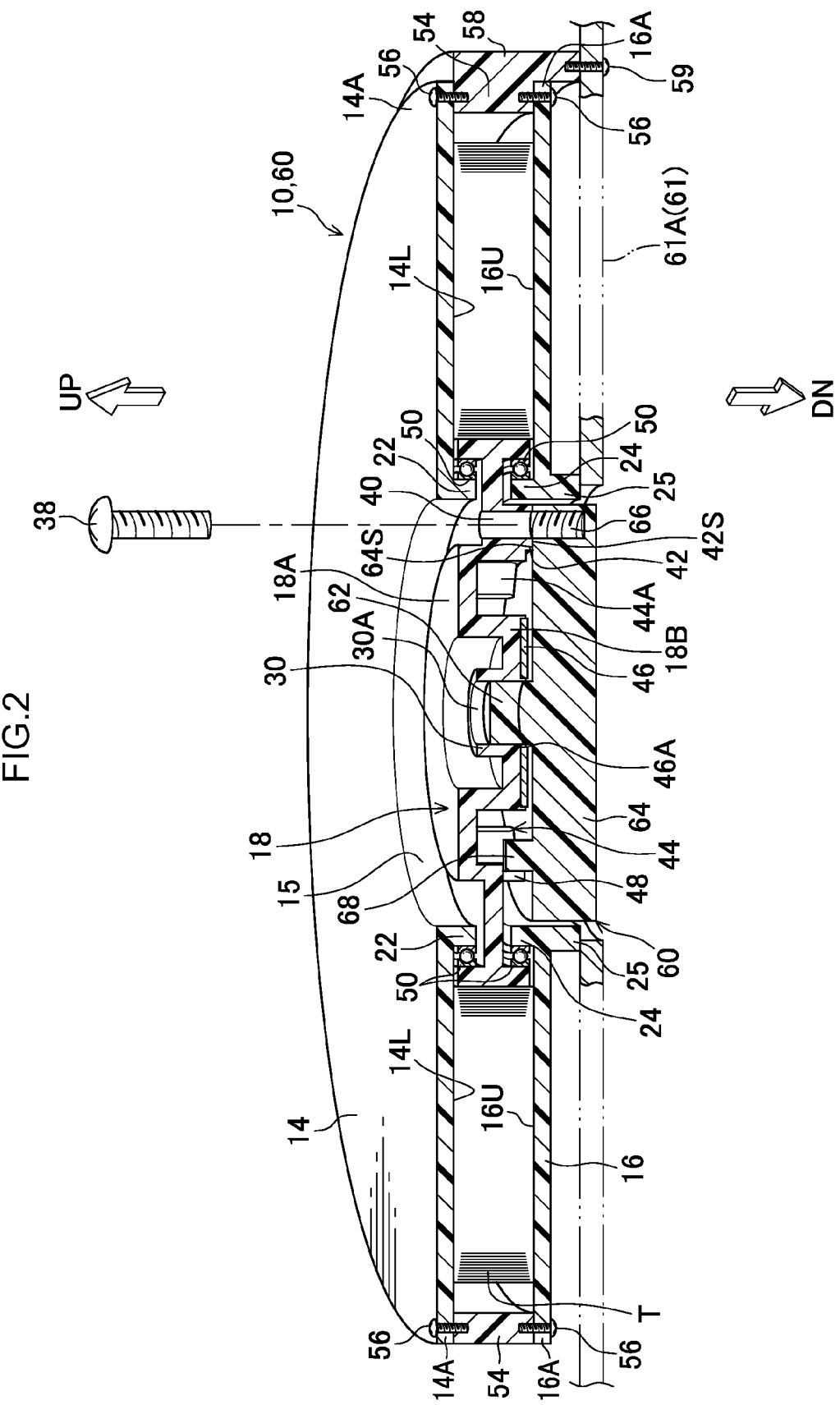
FIG. 2 is a cut view showing a joined state of the reel and the rotating member of the drive device, in the drive device relating to the embodiment of the present invention.

A drive device 60 relating to a first embodiment of the present invention is described on the basis of FIG. 1 through FIG. 5. First, the schematic overall structure of the drive device 60 and the basic structure of a reel 10 that structures the drive device 60 are described, and then, main portions of the drive device 60 are described in detail. Note that, for convenience of explanation, arrow UP in FIG. 2 is the upward direction, arrow DN is the downward direction, and the rotational axial direction of the reel 10 is the vertical direction (height direction).

(Schematic Overall Structure of Drive Device)

Figure 5:
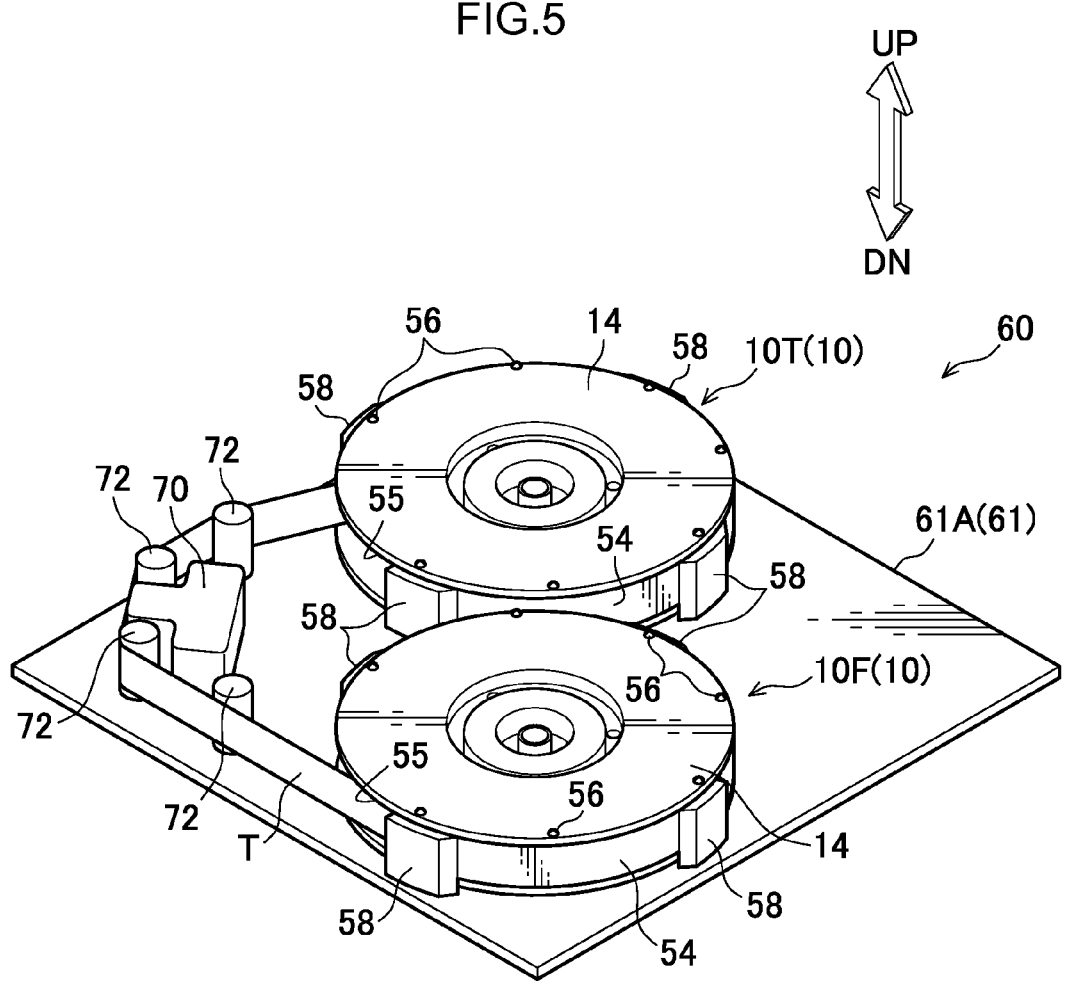
FIG. 5 is a perspective view showing the schematic overall structure of the drive device to which the reel is applied, in the drive device relating to the embodiment of the present invention.

As shown in FIG. 5, the drive device 60 has a casing 61. In FIG. 5, only a bottom plate 61A of the casing 61 is illustrated, but the casing 61 is formed on the whole in the shape of a flat box that is thin in the vertical direction, and accommodates a pair of reels 10F, 10T.

Namely, one of the reels 10 is the reel 1 OF for drawing-out of a recording tape T that is a magnetic tape or the like and that serves as an information recording/playback medium and is wound around a hub 12 thereof. On the other hand, the other of the reels 10 is a reel 10T for take-up that takes-up, on the hub 12 thereof, the recording tape T that has been drawn-out from the reel 10F. Namely, the reel 10F and the reel 10T form a pair around which the common recording tape T is taken-up. In this embodiment, the winding directions of the recording tape T are opposite directions at the reel 10F and the reel 10T. Due thereto, the recording tape T is wound around both of the reels 10F, 10T with the recording surface being the inner peripheral side. These reels 10F, 10T are provided as a pair such that users cannot remove them respectively from the casing 61 interior.

Plural tape guides 72 are provided within the casing 61, and these plural tape guides 72 define a traveling path of the recording tape T at the casing 61 interior. A magnetic head 70 is provided at the central portion (the portion between adjacent two of the tape guides 72) of the traveling path of the recording tape T that is defined by the plural tape guides 72 at the casing 61 interior. The magnetic head 70 is structured to carry out at least one of recording (writing) of information with respect to the recording tape T and playback (reading-out) of information recorded on the recording tape T.

In the drive device 60 relating to this embodiment, the magnetic head 70 is structured so as to, while slidingly-contacting the recording tape T that travels on the aforementioned traveling path, be able to carry out recording of information onto that recording tape T, playback of information recorded on that recording tape T. Due to the above, the drive device 60 is a structure that carries out recording, playback of information with respect to the recording tape T, within the range of the recording capacity of the incorporated recording tape T, without replacing (the reels 10F, 10T on which are wound) the recording tape T.

(Basic Structure of Reel)

The reels 10F, 10T have basically the same structure. Accordingly, in the following explanation, the reels 10F, 10T are called the reels 10 without differentiating therebetween, except for specially noted cases.

Cut views of the reel 10 are shown in FIG. 1, FIG. 2. As shown in these drawings, the reel 10 has the hub 12 around which the recording tape T is wound, an upper flange 14 that is one of a pair of flanges, and a lower flange 16 that is the other of the pair of flanges. The upper flange 14 projects-out toward the radial direction outer side at an axial direction one end side of the hub 12, and the lower flange 16 projects-out toward the radial direction outer side at the axial direction other end side of the hub 12. The upper flange 14, the lower flange 16 are structured to restrict the positions of the transverse direction end portions of the recording tape T (guide the recording tape T) that is wound around the outer peripheral surface of a cylindrical tube portion 20 that structures the hub 12.

The hub 12 has a disc portion 18 that is provided at the inner side of the cylindrical tube portion 20. The disc portion 18 is structured to function as a drive driven portion that is driven by an unillustrated driving motor of the drive device 60, and as a winder driven portion that is rotated and driven in a step of winding the recording tape T around the cylindrical tube portion 20 before assembly into the drive device 60.

A central boss 30 that is formed in the shape of a tube is formed at the axially central portion of the disc portion 18. Further, as described later, plural screw holes 40 for fixing to a rotating member of the drive device 60 are formed in the portion at the outer peripheral side at the disc portion 18. Moreover, an outer-side bag portion 18A, that opens downward, and an inner-side bag portion 18B, that opens upward, are formed as if continuous in the radial direction, at the radial direction inner side of the region where the screw holes 40 are formed at the disc portion 18 and at the radial direction outer side of the central boss 30.

A reel gear 44, with which is meshed-together a driving gear of a winder (winding device) that is used in the step of taking-up the recording tape T onto the cylindrical portion 20, is formed at the inner side of the outer-side bag portion 18A. The reel 44 is structured by plural gear teeth 44A, that are formed so as to extend over a bottom plate portion and an annular wall at the radial direction outer side of the outer-side bag portion 18A, being disposed at uniform intervals in the peripheral direction.

On the other hand, a reel plate 46, that is formed in an annular form and of a magnetic metal, is fixed by insert molding to the bottom surface of the inner-side bag portion 18B. The axially central portion of the reel plate 46 is made to be a central hole 46A through which a projecting shaft portion 62 is inserted. In a state in which the reel gear 44 is meshed-together with the driving gear of the winding device, the reel plate 46 is attracted and held by a magnet of that winding device. In other words, due to the reel plate 46 being attracted and held by the magnet of the winding device, the reel gear 44 is maintained in a state of being meshed-together with the driving gear of the winding device.

The upper flange 14 and the lower flange 16 oppose one another in the reel axial direction at the radial direction outer side of the cylindrical tube portion 20. With regard to the opposing interval between the upper flange and the lower flange 16, the opposing interval in the reel axial direction is wider at the outer peripheral side than at the cylindrical tube portion 20 side of the hub 12. Concretely, a lower surface 14L of the upper flange 14 and an upper surface 16U of the lower flange 16, that are opposing surfaces, are respectively tapered surfaces that are inclined so as to move away from the recording tape T more at the outer peripheral side than at the inner peripheral side.

In this embodiment, the taper amount (the difference in the positions, in the reel axial direction, at the inner- and outer-most peripheral portions) of the lower surface 14L of the upper flange 14 and the upper surface 16U of the lower flange 16 are respectively 0.1 mm to 0.2 mm (an opposing interval of 0.2 mm to 0.4 mm), regardless of the reel diameter. The taper amount of this lower surface 14L of the upper flange 14 and upper surface 16U of the lower flange 16 is determined in accordance with the allowed value of positional offset in the transverse direction of the recording tape T. Therefore, there are also cases in which the taper amount differs from the aforementioned value, depending on the required performances (the pitch of the tracks, and the like). Note that, because the taper amount is minute as described above, it is difficult to see the absence/presence of a taper in FIG. 1, FIG. 2.

Other than the reel plate 46 and screws 36, 38, the hub 12, the upper flange 14 and the lower flange 16 that structure the reel 10 are respectively structured by injection molding of a resin material such as, for example, polycarbonate (PC) or the like. Further, in order to improve the rigidity of the reel 10, portions of or the entireties of the hub 12, the upper flange 14 and the lower flange 16 may be structured by using a resin material such as PC or the like that is reinforced by reinforcing fibers such as, for example, carbon fibers or the like.

(Structure of Main Portions of Reel)

As shown in FIG. 1, in the above-described drive device 60, the upper flange 14, the lower flange 16 rotate freely with respect to the hub 12. Concretely, the upper flange 14, the lower flange 16, that are fixed to the casing 61 as described later, are mounted to the hub 12, that is fixed to a rotating member 64, respectively via rolling bearings 50 that serve as bearing members.

More concretely, the plural (three in this embodiment) screw holes 40, that are for joining to the rotating member 64 that is rotated and driven by the unillustrated driving motor of the drive device 60, are formed at uniform intervals in the peripheral direction in the outer peripheral side portion at the disc portion 18. In this embodiment, the respective screw holes 40 are disposed in a virtual arc shape that is common to screw bosses 33. A boss 42, that projects-out downward, is formed at the periphery of each of the screw holes 40, and the bottom surfaces of the bosses 42 are reference surfaces 42S that are a positional reference in the vertical direction.

Further, the projecting shaft portion 62, that projects-out from the axially central portion of the rotating member 64, is fit-together with a projecting-shaft hole 30A of the central boss 30 that is formed at the axially central portion of the disc portion 18. Due thereto, before the hub 12 is joined to the rotating member 64 by the screws 38, centering (axial alignment) of the hub 12 with respect to that rotating member 64 is achieved. Moreover, a cut-out 48 that opens downward is formed at the bottom surface side of the disc portion 18. The cut-out 48 is a structure that, due to a convex portion 68 that projects-out from the rotating member 64 being placed into the cut-out 48, carries out positioning in the peripheral direction of the hub 12 with respect to that rotating member 64.

Further, the disc portion 18, i.e., the hub 12, is coaxially and fixedly joined to the rotating member 64 in a state in which the reference surfaces 42S of the respective bosses 42 are thrust against a top end surface, that is a reference surface 64S in the vertical direction, of the rotating member 64. Here, due to the screws 38 (see FIG. 2), that are passed-through the screw holes 40, being screwed-together with female screw portions 66 that are formed at the rotating member 64, the hub 12 is coaxially and fixedly joined to the rotating member 64. Due thereto, the hub 12 is a structure that is rotated and driven by operation of the driving motor of the drive device 60.

On the other hand, an annular (tubular) portion that projects-out downward is provided at the axially central portion of the upper flange 14, and an annular (tubular) portion that projects-out upward is provided at the axially central portion of the lower flange 16. Further, as shown in FIG. 3 as well, the rolling bearings 50 are disposed between the cylindrical tube portion 20 and annular portions 22, 24 in the radial direction, and are disposed between the upper flange 14, the lower flange 16 and the disc portion 18 in the axial direction.

Figure 3A:
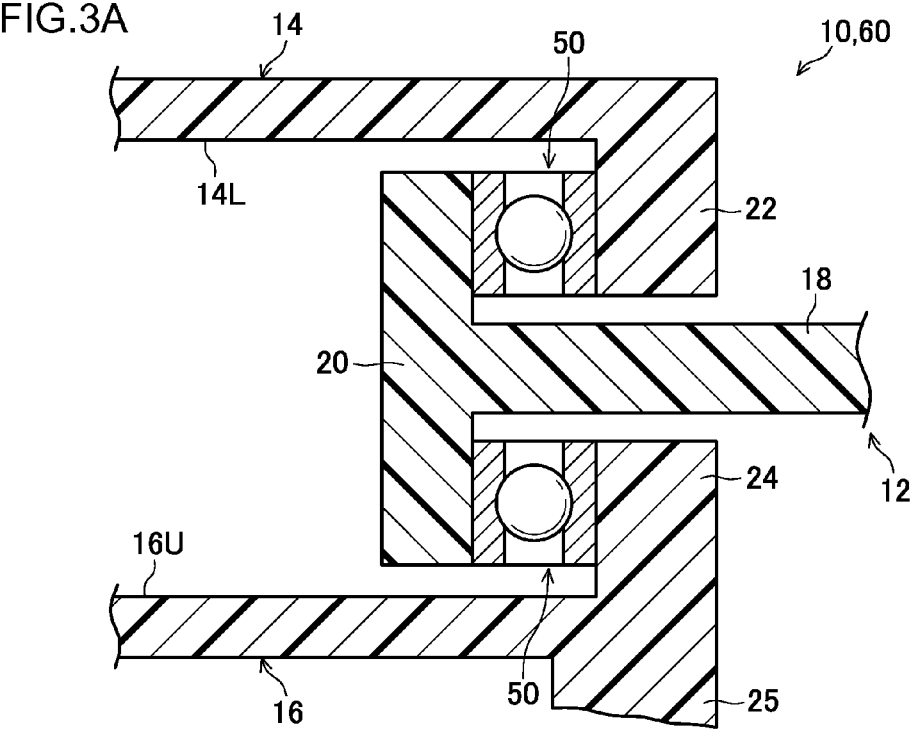
FIG. 3A is a cross-sectional view showing, in an enlarged manner, a first example of rolling bearings that structure the reel, in the drive device relating to the embodiment of the present invention.
Figure 3B:
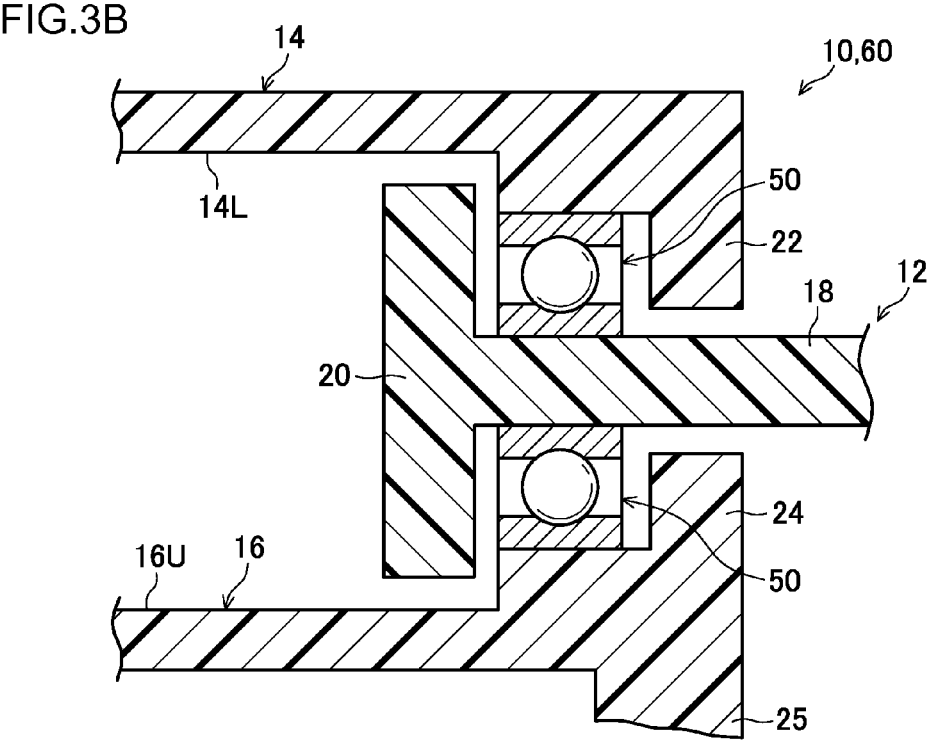
FIG. 3B is a cross-sectional view showing, in an enlarged manner, a second example of rolling bearings that structure the reel, in the drive device relating to the embodiment of the present invention.

As shown in FIG. 3A, the rolling bearings 50 may be structures that are fixed to the cylindrical tube portion 20 at the hub side and to the annular portions 22, 24 at the flange sides. Further, as shown in FIG. 3B, the rolling bearings 50 may be structures that are fixed to the disc portion 18 at the hub side and to inner peripheral side portions of the upper flange 14, the lower flange 16 at the flange sides. Note that, in the case of the structure shown in FIG. 3B, portions, that contact the roller bearings 50, at the lower surface 14L of the upper flange 14 and the upper surface 16U of the lower flange 16 are horizontal surfaces that run along a plane orthogonal to the reel axis (are structures that do not have the aforementioned taper).

Figure 4:
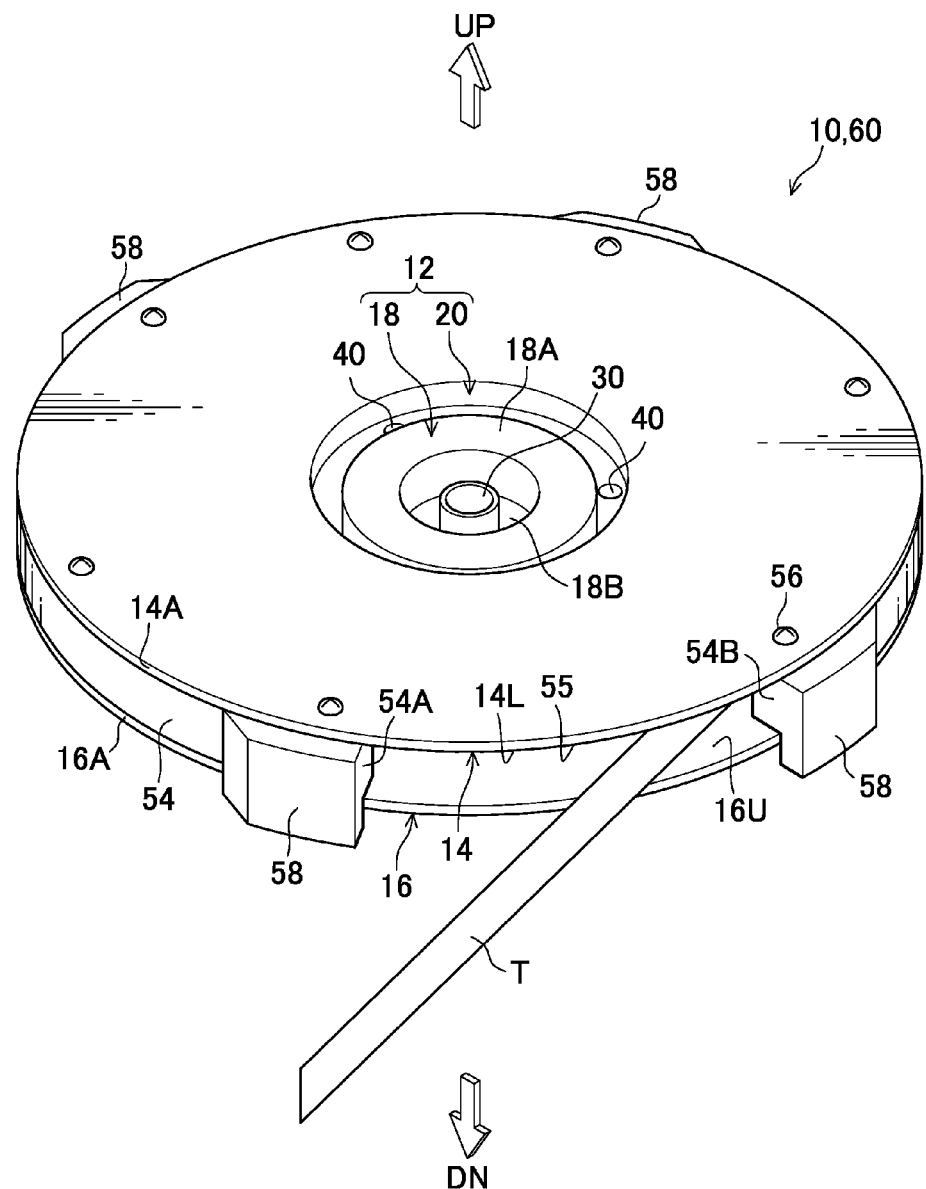
FIG. 4 is a perspective view showing the schematic overall structure of the reel, in the drive device relating to the embodiment of the present invention.

Further, as shown in FIG. 4, the drive device 60 (the reel 10) has a side wall 54 that serves as a connecting member that connects an outer peripheral edge portion 14A of the upper flange 14 and an outer peripheral edge portion 16A of the lower flange 16. As seen from the axial direction, the side wall 54 forms an arc that runs along the outer peripheral edge portions 14A, 16A of the upper flange 14, the lower flange 16. The side wall 54 connects the outer peripheral edge portions 14A, 16A of the upper and lower flanges 14, 16 continuously along a range that is greater than or equal to 180° and less than 360°. An opening portion 55, that is surrounded by the upper and lower flanges 14, 16 and end portions 54A, 54B in the peripheral direction of the side wall 54, is a tape path for the drawing-out or taking-up of the recording tape T. The opening portion 55 is determined such that the recording tape T does not contact the peripheral direction end portions 54A, 54B of the side wall 54 that is fixed to the casing 61 as described later, between a state in which the recording tape T is completely taken-up onto the cylindrical tube portion 20 and a state in which the recording tape T is completely drawn-out from the cylindrical tube portion 20.

As shown in FIG. 1, the side wall 54 in this embodiment is fastened and joined to the outer peripheral edge portions 14A, 16A at plural places in the peripheral direction by screws 56. Namely, the upper flange 14, the lower flange 16 are fixed together via the side wall 54 (relative displacement is restricted).

Moreover, the side wall 54, that is formed as a body separate from the upper flange 14, the lower flange 16, is nipped-in and placed-in between the outer peripheral edge portions 14A, 16A of the upper flange 14, the lower flange 16, and functions as a spacer that maintains the interval between these outer peripheral edge portions 14A, 16A. More concretely, at the side wall 54, an upper end surface 54U directly contacts the lower surface 14L of the upper flange 14, and a lower end surface 54L directly contacts the upper surface 16U of the lower flange 16.

In this contacting state, the side wall 54 is fastened and fixed to the upper flange 14, the lower flange 16 by the screws 56 that are passed-through the upper flange 14 and the screws 56 that are passed-through the lower flange 16. Note that the portions, that contact the side wall 54, at the lower surface 14L of the upper flange 14 and the upper surface 16U of the lower flange 16 are horizontal surfaces that run along a plane orthogonal to the reel axis (are structures that do not have the aforementioned taper).

Further, the reel 10 has fixing leg portions 58 that serve as fixing portions for fixing the upper flange 14, the lower flange 16 to the casing 61 of the drive device 60. In this embodiment, the fixing leg portions 58 project-out in the radial direction from plural places in the peripheral direction at the side wall 54, and project-out further downwardly than the lower flange 16. Note that, in FIG. 1 and FIG. 2, the cross-section of a portion where the fixing leg portion 58 is provided at one side with respect to the reel axis is shown, and the cross-section of a portion where the fixing leg portion 58 is not provided at the other side with respect to the reel axis is shown.

The bottom end surfaces of the respective fixing leg portions 58 are axial direction reference surfaces of (the upper flange 14 and the lower flange 16 that are the fixed sides of) the reel 10, and are structures at which the position in the axial direction, with respect to the casing 61, of the reel 10 is determined in the state in which these bottom end surfaces are placed on the reference surface at the casing 61 side. In this positioned state, as shown in FIG. 2, the respective fixing leg portions 58 are fixed to the casing 61 by screws 59.

Moreover, a supported portion 25, that contacts the top surface of the bottom plate 61A, projects-out downward from a portion, that is further toward the radial direction inner side than the outer peripheral surface of the cylindrical tube portion 20 (the take-up surface of the recording tape T), at the lower flange 16. In this embodiment, the supported portion 25 projects-out in the direction opposite the annular portion 24, at the edge at the inner peripheral side of the lower flange 16. The supported portion 25 may be formed in an annular shape, or may be formed so as to be divided into plural portions in the peripheral direction.

Due to the above, the reel 10 is a structure in which, at times of drawing-out and taking-up the recording tape T, the hub 12 rotates, and on the other hand, the upper flange 14, the lower flange 16 do not rotate. The relative rotation between the hub 12 and the upper flange 14 and the lower flange 16 is permitted by the rolling bearings 50.

Operation of the present embodiment is described next.

In the drive device 60 of the above-described structure, the upper flanges 14, the lower flanges 16 of the reel 10F, the reel 10T are fixed to the casing 61 via the fixing leg portions 58, and, at the disc portions 18, the hubs 12 are fixed to the rotating members 64. The portion, between the reels 10F, 10T, of the recording tape T is trained around the respective tape guides 72 so as to contact the magnetic head 70 at the traveling path.

In this drive device 60, at times of recording information onto the recording tape T or playing-back information from the recording tape T, the reel 10F, the reel 10T are rotated and driven synchronously in opposite directions. Thereupon, the recording tape T travels along the traveling path that is defined by the tape guides 72, and information is written or information is read-out by the magnetic head 70.

At the time of traveling of the recording tape T in the above-described drive device 60, the recording tape T is guided at a predetermined tape path due to the upper flanges 14, the lower flanges 16 restricting the position in the transverse direction of the recording tape T.

Here, in the present drive device 60, the hub 12 can rotate relative to the pair of upper and lower flanges 14, 16 due to the rolling bearings 50. Therefore, in the structure in which the outer peripheral portions of the pair of upper and lower flanges 14, 16 are connected by the side wall 54, the recording tape T, and the peripheral direction end portions 54A, 54B of the side wall 54, interfering with one another accompanying the drawing-out or the taking-up of the recording tape T is prevented.

Further, in the present drive device 60, because the outer peripheral portions of the pair of upper and lower flanges 14, 16 are connected together by the side wall 54 as described above, deformation (warping) of the pair of upper and lower flange 14, 16 is suppressed. Namely, the recording tape T is wound around the cylindrical tube portion 20 of the hub 12 so as to be offset toward either one of the upper and lower flange sides due to curving (curvature) that is as if the transverse direction end portions form an arc as seen from the thickness direction of the recording tape T. When the aforementioned either one of the flanges deforms (warps) due to the pushing force from this recording tape T, the accuracy of restricting the position in the transverse direction of the recording tape T deteriorates. Here, at the present reel 10, the outer peripheral portions of the pair of upper and lower flanges 14, 16 are connected together by the connecting member, and therefore, deformation of the pair of upper and lower flanges 14, 16 due to the pushing force from the recording tape T is suppressed.

As a comparative example, the example can be given of a structure in which the rigidities of the upper and lower flanges 14, 16 themselves are increased and deformation of these flanges 14, 16 is suppressed. For example, in a structure in which metal reinforcing members are embedded into the flanges, insert molding is needed, and therefore, costs increase and the mass of the flange (the rotating portion) increases. Further, there are also cases in which, at a flange that is a resin molded part, warping arises due to the residual stress that depends on the position of the gate. Moreover, as another comparative example, the example can be given of a structure that reinforces the hub in a structure in which the flanges deform due to deformation of the hub. In this structure, the reinforcing effect is small with respect to load that acts directly on the flanges. Further, in a structure in which a part, such as a brake for locking rotation, or the like, is disposed at the interior of the hub, reinforcement itself of the hub is difficult.

In contrast, in the drive device 60, the outer peripheral edge portions 14A, 16A of the upper and lower flanges 14, 16 are connected by the side wall 54. Namely, the outer peripheral edge portion, at which deformation is greatest in a case in which the side wall 54 is not provided at the flange that is supported at the hub 12 at the inner peripheral side, and the outer peripheral edge portion, at which deformation is greatest in a case in which the side wall 54 is not provided at the opposing flange, are connected by the side wall 54. Due thereto, the flanges 14, 16 are directly reinforced, and the rigidities of these flanges 14, 16 with respect to warping markedly improve. Therefore, as described above, warping of the pair of upper and lower flanges 14, 16 is suppressed.

Further, in the drive device 60, the upper flange 14 and the lower flange 16 are fixed to the casing 61. Therefore, the upper flange 14 and the lower flange 16 can be positioned highly accurately with respect to the traveling path of the recording tape T within the casing 61 (the magnetic head 70, the tape guides 72 that are traveling height references).

In this way, in the drive device 60 relating to the present embodiment, the accuracy of restricting the transverse direction position of the recording tape T that travels can be improved.

Further, in the drive device 60, the pair of flanges 14, 16 is fixed at the fixing leg portions 58 with respect to the casing 61 that forms the traveling space of the recording tape T. Therefore, the pair of flanges 14, 16 does not rotate together with the hub 12 accompanying contact with the recording tape T that travels. Due thereto, interference between the recording tape T and (the peripheral direction end portions 54A, 54B of) the side wall 54, that accompanies the pair of flanges 14, 16 rotating with respect to the casing 61, is reliably prevented.

In particular, at the drive device 60, because the supported portion 25 is provided at the inner peripheral side of the lower flange 16, the lower flange 16 is a structure that is supported (fixed) at both ends by the fixing leg portions 58 and the supported portion 25 in a sectional view formed by the axial direction and the radial direction. Due thereto, the load that is based on the mass of the recording tape T can be supported well at the lower flange 16 that is in a state in which bending thereof is suppressed. Therefore, the accuracy of restricting the transverse direction position, with respect to the casing, of the recording tape T that travels can be improved more.

Further, in the drive device 60, because the hub 12 is fixed to the rotating member 64, the hub 12 and the rotating member 64 rotate coaxially and integrally without offset of the centers thereof. Due thereto, interference between the hub 12 and the pair of upper and lower flanges 14, 16 is prevented or effectively suppressed. Moreover, due to the reference surfaces 42S of the hub 12 contacting the reference surface 64S of the rotating member 64, the position in the axial direction of this hub 12 is determined accurately with respect to this rotating member 64, i.e., the casing 61 that structures the traveling space of the recording tape T. Due thereto, at the drive device 60, the accuracy of restricting the transverse direction position, with respect to the casing 61, of the recording tape T that travels can be improved more.

Moreover, at the drive device 60, because the fixing leg portions 58 are provided at the side wall 54, the pair of flanges 14, 16 can be fixed to the casing 61 without affecting the surface accuracy of the pair of flanges 14, 16. Namely, when thick-walled portions are formed at the upper flange 14, the lower flange 16 that are resin molded parts, the dimensional accuracy of the flange surfaces (the surfaces at the recording tape T side) is affected due to sink marks or the like. In contrast, in the present drive device 60 in which the fixing leg portions 58 are provided at the side wall 54, the desired surface accuracy is ensured without the pair of flanges 14, 16 being affected by the fixing leg portions 58.

Further, in the drive device 60, the supported portion 25 is formed further toward the radial direction inner side than the innermost layer of the recording tape T at the flange 16. Therefore, the inner peripheral side of this flange 16 can be supported at the casing 61 by the supported portion 25, without the surface accuracy of the flange 16 being affected. In other words, the supported portion 25, that suppresses bending deformation of the flange 16, can be provided without affecting the surface accuracy of the portion, that restricts the position of the recording tape T, at the flange 16.

Moreover, at the drive device 60, the upper end surface 54U, the lower end surface 54L of the side wall 54 are fixed to the pair of flanges 14, 16 in states of directly contacting the lower surface 14L of the upper flange 14 and the upper surface 16U of the lower flange 16. Therefore, narrowing of the opposing interval between this pair of flanges 14, 16 is prevented or effectively suppressed. For example, as comparative examples, examples can be given of a structure in which adhesive layers are provided between the upper end surface 54U, the lower end surface 54L of the side wall 54 and the lower surfaces 14L, 16L of the flanges 14, 16, and a structure in which the outer peripheral edge portions of the flanges 14, 16 are fit into grooves of the connecting member. In such comparative examples, there is the concern that the space between the opposing surfaces of the pair of flanges 14, 16 will narrow due to deformation of the adhesive layers or play of the fit-in structure. In contrast, in the drive device 60, as described above, it is easy for (the lower limit value of) the space between the opposing surfaces of the pair of flanges 14, 16 to be maintained.

Still further, at the drive device 60, the hub 12 is connected via the rolling bearings 50 so as to be able to rotate relative to the pair of upper and lower flanges 14, 16. Therefore, the reel 10, that is formed by the hub 12 and the pair of upper and lower flanges 14, 16 being connected, can be handled integrally (as an assembly) before being assembled into the casing. Further, it is easy to ensure the relative positional accuracy between the hub 12 and the pair of upper and lower flanges 14, 16, and this also contributes to improving the accuracy of restricting the transverse direction position, with respect to the casing 61, of the recording tape T that travels.

Still further, in the drive device 60, because the respective rolling bearings 50 are provided at the inner side of the cylindrical tube portion 20 of the hub 12, the dimension (overlapped amount) in the reel axial direction of the bearing structures can be ensured within the limited range of the dimension in the reel axial direction. For example, in a comparative example in which the bearing structures are provided at the axial direction outer sides of the hub 12 (the portion around which the recording tape is wound), the dimension in the axial direction of the reel becomes large, or the dimension in the reel axial direction of the rolling bearing 50 is limited.

In contrast, in the drive device 60 in which the rolling bearings 50 are provided at the inner side of the cylindrical tube portion 20, the rolling bearings 50, that have sufficient dimensions in the reel axial direction, can be provided without affecting the dimension in the reel axial direction. Accordingly, in the drive device 60, offset of the axes of the hub 12 and the pair of flanges 14, 16 (tilting of the flanges with respect to the reel axis) can be suppressed, while the dimension in the reel axial direction is kept within a limited range. Namely, in the present reel, not only deformation of the flanges themselves, but also relative displacement between the pair of flanges and the hub that is a separate body are effectively suppressed.

In particular, in the drive device 60, the bearings that connect the hub 12 and the pair of flanges 14, 16 are the rolling bearings 50. Therefore, a state, in which the accuracy of restricting the transverse direction position of the recording tape T that travels is improved, is maintained in a structure that rotates the hub at a high rotational speed over a long time period.

In a case in which the accuracy of restricting the transverse direction position of the recording tape T that travels is low, there is the concern that, at the recording tape T at which numerous tracks are formed in the transverse direction, the positional offset in the transverse direction will exceed the allowed value and reading/writing of information by the magnetic head 70 will be carried out with respect to a track that is offset in this transverse direction. In contrast, in the present reel, the accuracy of restricting the transverse direction position of the recording tape T is ensured as described above, and therefore, reading/writing of information with respect to the correct track can be carried out by the magnetic head 70.

Due to the above, in the drive device 60 to which the reel 10 is applied, the recording tape T can be made to travel while fluctuations in the transverse direction of the recording tape T are suppressed. Therefore, information is properly read or written by the magnetic head 70 at a proper posture with respect to the magnetic head 70, while the recording tape T is made to travel at high speed within the casing 61.

Note that the above-described embodiment illustrates an example in which the hub 12 and the upper and lower flanges 14, 16 are connected via the rolling bearings 50, but the present invention is not limited to this. Accordingly, the hub 12 and the upper and lower flanges 14, 16 may be structures that are not connected, as shown in FIG. 6 for example.

Figure 6:
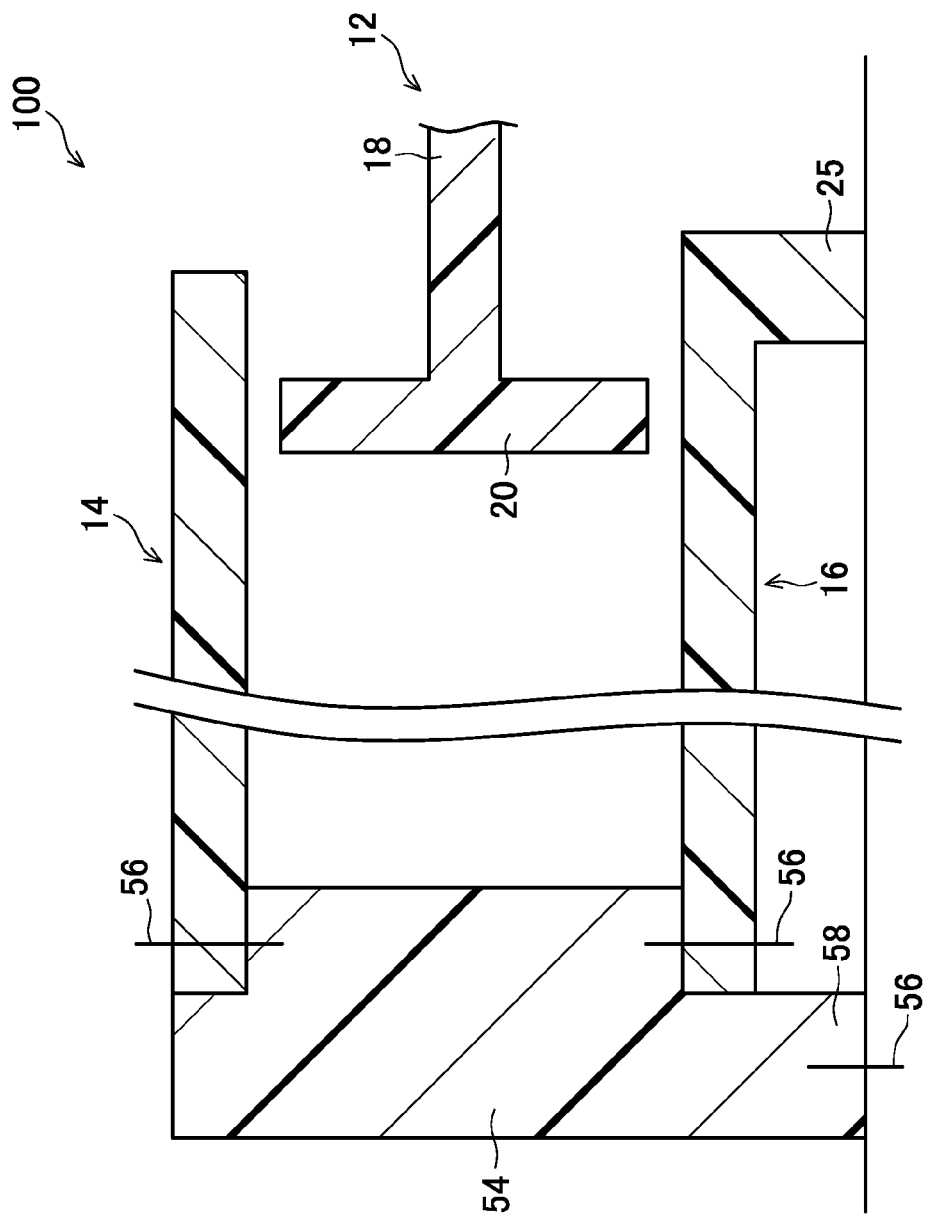
FIG. 6 is a cross-sectional view showing a drive device relating to a modified example of the embodiment of the present invention.

In a drive device 100 relating to a modified example shown in FIG. 6, the lower flange 16 is supported at the casing 61 by the fixing leg portions 58 and the supported portion 25, in the same way as in the above-described embodiment. On the other hand, the upper flange 14 is supported at the casing 61 via the side wall 54 and the fixing leg portions 58. Therefore, in order to ensure the rigidity of the upper flange 14, for example, the upper flange 14 may be formed in the shape of a disc that does not have a hole at the center thereof, or the inner peripheral side of the upper flange 14 may be fixed to a ceiling plate (not shown) of the casing 61. Further, for example, the upper flange 14 may be formed integrally with the casing 61. Similarly, the lower flange 16 may be formed integrally with the casing 61.

In a structure in which the hub 12 and the upper and lower flanges 14, 16 are not connected (a case in which the hub 12 and the upper and lower flanges 14, 16 do not structure the reel 10), the drive device 60 sets the hub 12, around which the recording tape T is wound, on the lower flange 16 that is fixed in advance to the casing 61. Then, after that hub 12 is fixed to the rotating member 64, the flange 14 is joined to the flange 16 via the side wall 54.

In the drive device 60 relating to this modified example, it is difficult for the pair of flanges 14, 16 and the hub 12 to be affected by (the accumulation of) the manufacturing errors thereof, and the like. Therefore, the upper flange 14 and the lower flange 16 that are fixed to the casing 61 are positioned with higher accuracy with respect to the traveling path of the recording tape T within that casing 61 (the magnetic head 70, the tape guides 72 that are traveling height references).

Figure 7:
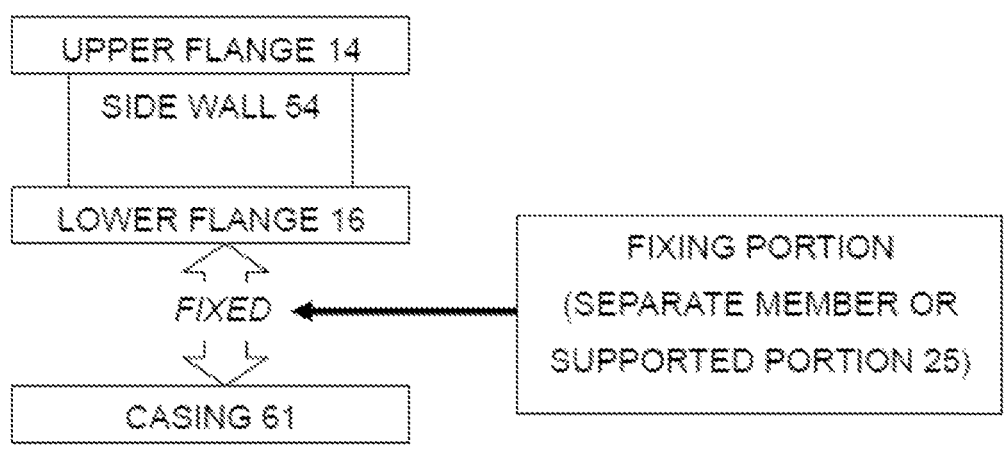
FIG. 7 is a conceptual illustration of aspects of the reel, in the drive device of the present disclosure.

Note that the above-described embodiment and modified example illustrate examples in which the fixing leg portions 58 are formed integrally with the side wall 54, or in other words, illustrate examples in which the fixing leg portions 58 are disposed at the outermost peripheral portion, but the present invention is not limited to this. For example, as shown in FIG. 7, there may be a structure in which the pair of flanges 14, 16 are fixed to the casing 61 via a fixing portion that is a separate member, or, for example, the supported portion 25 may be used as a fixing portion of the casing 61 and the flange 16 by fastening or the like. The placement of the fixing portion that is a separate member is not limited to the reel outermost peripheral portion. Further, a fixing portion may be provided at the radial direction central portion of the lower flange 16, or may be fixed to (the unillustrated ceiling plate of) the casing 61 at the upper flange side. Moreover, the fixing leg portion 58 is not limited to a structure in which a plurality thereof are provided in the peripheral direction, and, for example, may be a structure in which the fixing leg portion 58 is formed along the entire length of the side wall 54.

Further, although the above-described embodiment illustrates an example in which the upper flange 14, the lower flange 16 are fastened and fixed to the side wall 54 by the screws 56, the present invention is not limited to this. For example, the side wall 54 may be a structure that is fixed to these upper and lower flanges 14, 16 by being nipped by clamps together with the upper and lower flanges 14, 16.

Moreover, the above-described embodiment illustrates an example in which the hub 12 and the pair of flanges 14, 16 are connected via the rolling bearings 50 so as to be able to rotate relatively, but the present invention is not limited to this. For example, the hub 12 and the pair of flanges 14, 16 may be structures that are connected via slide bearings so as to be able to rotate relatively.

What is claimed is:

1. A drive device comprising:
   a hub around which a recording tape is wound;
   a pair of flanges that are provided at both axial direction sides of the hub so as to be able to rotate relative to the hub, and that restrict a position, in a transverse direction, of the recording tape;
   a connecting member that connects outer peripheral portions of the pair of flanges together at least at a portion other than a traveling path of the recording tape;
   a casing having, at an interior, a space in which the hub and the pair of flanges are accommodated and in which the recording tape travels; and
   a fixing portion, that is provided at at least one of the pair of flanges or at the connecting member, the fixing member being fixed to the casing.

2. The drive device of claim 1, further comprising a rotating member to which the hub is fixed such that the hub rotates coaxially and integrally therewith, and that transmits rotational force to the hub.

3. The drive device of claim 2, wherein a reference surface, that abuts an end surface in a rotational axial direction of the rotating member and that is a positional reference in the rotational axial direction, is provided at the hub.

4. The drive device of claim 2, wherein
   the casing is set such that a rotational axial direction of the rotating member coincides with a direction of gravitational force, and
   the flange, that is positioned at a lower side in the direction of gravitational force among the pair of flanges, is fixed at an outer peripheral side to a bottom plate of the casing via the fixing portion, and has, at the inner peripheral side, a supported portion that contacts and is supported by the bottom plate.

5. The drive device of claim 4, wherein the flange, that is positioned at the lower side in the direction of gravitational force among the pair of flanges, has a portion that is positioned further toward a radial direction inner side than an outer peripheral surface of the hub, and the supported portion is provided at the portion.

6. The drive device of claim 2, wherein the hub and the pair of flanges are connected so as to be able to rotate relatively, by bearing members that are interposed between the hub and the pair of flanges.

7. The drive device of claim 6, wherein the bearing members are provided at an inner side of the hub.

8. The drive device of claim 2, wherein the hub and the pair of flanges are made able to rotate relatively by not being connected.

9. The drive device of claim 1, wherein the fixing portion is provided at the connecting member.

10. The drive device of claim 1, wherein the connecting member is structured as a body that is separated from the pair of flanges, and is fixed to outer peripheral portions of the pair of flanges respectively in a state of being nipped between opposing surfaces of the pair of flanges while contacting the opposing surfaces respectively.

11. A drive device comprising:
    a hub around which a recording tape is wound;
    a pair of flanges that are provided at both axial direction sides of the hub so as to be able to rotate relative to the hub, and that restrict a position, in a transverse direction, of the recording tape;

a connecting member that connects outer peripheral portions of the pair of flanges together at least at a portion other than a traveling path of the recording tape;

a casing having, at an interior, a space in which the hub and the pair of flanges are accommodated and in which the recording tape travels; and a fixing portion, that is provided at the connecting member and that is fixed to the casing.

12. The drive device of claim 11, further comprising a rotating member to which the hub is fixed such that the hub rotates coaxially and integrally therewith, and that transmits rotational force to the hub.

13. The drive device of claim 12, wherein a reference surface, that abuts an end surface in a rotational axial direction of the rotating member and that is a positional reference in the rotational axial direction, is provided at the hub.

14. The drive device of claim 12, wherein the casing is set such that a rotational axial direction of the rotating member coincides with a direction of gravitational force, and the flange, which is positioned at a lower side in the direction of gravitational force among the pair of flanges, is fixed at an outer peripheral side to a bottom plate of the casing via the fixing portion, and has, at the inner peripheral side, a supported portion that contacts and is supported by the bottom plate.

15. The drive device of claim 14, wherein the flange, that is positioned at the lower side in the direction of gravitational force among the pair of flanges, has a portion that is positioned further toward a radial direction inner side than an outer peripheral surface of the hub, and the supported portion is provided at the portion.

16. The drive device of claim 12, wherein the hub and the pair of flanges are connected so as to be able to rotate relatively, by bearing members that are interposed between the hub and the pair of flanges.

17. The drive device of claim 16, wherein the bearing members are provided at an inner side of the hub.

18. The drive device of claim 12, wherein the hub and the pair of flanges are made able to rotate relatively by not being connected.

19. The drive device of claim 11, wherein the fixing portion is provided at the connecting member.

20. The drive device of claim 12, wherein the connecting member is structured as a body that is separated from the pair of flanges, and is fixed to outer peripheral portions of the pair of flanges respectively in a state of being nipped between opposing surfaces of the pair of flanges while contacting the opposing surfaces respectively.

* * * * *